Dec. 15, 1931.    R. BERTHON    1,836,787
PROJECTION OF RETICULATED FILMS
Filed July 16, 1926
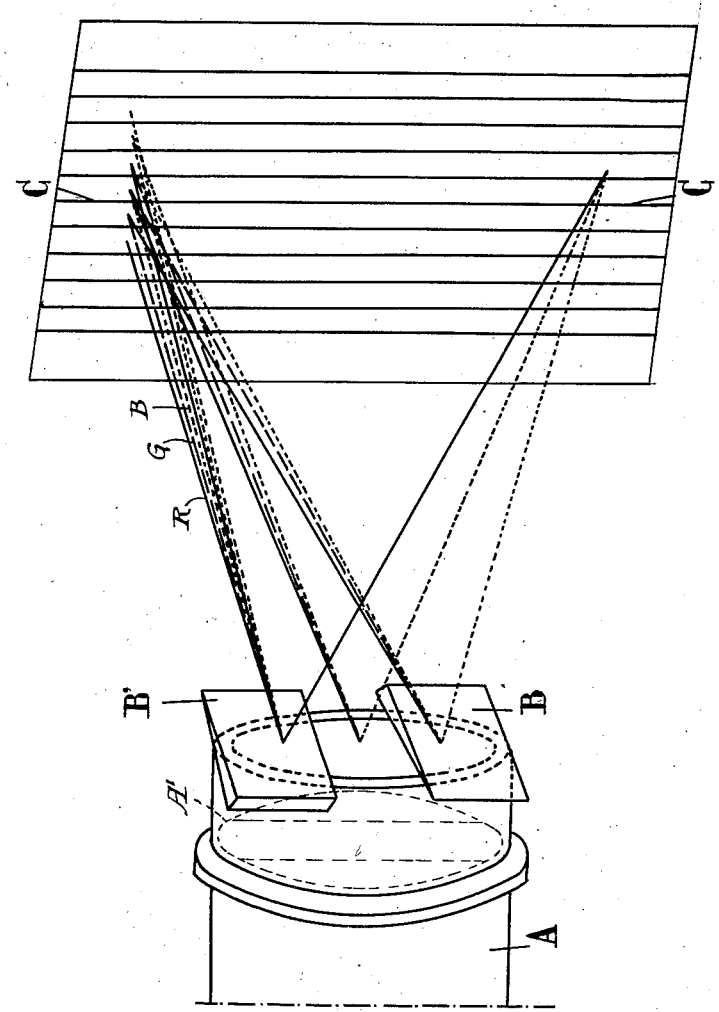
Inventor:
Rodolphe Berthon
By
Attorney.

Patented Dec. 15, 1931

1,836,787

UNITED STATES PATENT OFFICE

RODOLPHE BERTHON, OF NEUILLY SUR SEINE, FRANCE, ASSIGNOR, BY MESNE ASSIGNMENTS, TO KISLYN CORPORATION, OF NEW YORK, N. Y., A CORPORATION OF DELAWARE

PROJECTION OF RETICULATED FILMS

Application filed July 16, 1926, Serial No. 122,989, and in France February 11, 1926.

When any reticulated film is projected with substantial enlargement, whether said film is printed in colours or is simply covered with a network of refracting microscopic elements, but provided only that the colours are symmetrically distributed over the whole surface, the much enlarged image is found to be composed of an assemblage of juxtapositioned cells or even of lines juxtapositioned and each comprising the fundamental primary colours (or even the full spectral colours). Those polychrome cells or lines naturally are the finer, the finer the nets of the film; but nevertheless, they remain clearly distinct, a fact which is detrimental to thorough blending in the screening effects and which generally renders reprinting very awkward.

The object of my invention is to provide a process and an optical device which will permit the coloured cells or lines to be eliminated on projection and consequently will permit images to be obtained which are as blended as non-reticulated images, such blended images being capable of reprinting as easily as if the original scene was being directly photographed.

The characteristic of my process is the same both in the case of point or dotted nets and in the case of line nets, but, in order to simplify explanations, I will describe only the performance thereof in the case of line nets, it being clearly understood that, mutatis mutandis, my process affords the same results in the case of dotted nets.

Persons skilled in the art are aware that each part of a properly corrected objective operates as a complete objective; in other words, that if a part of the objective is masked the part left uncovered will give a complete image of the object or area photographed, or, with inverted march of rays, will cover the whole of a projection screen from an image focused in the said objective or lens. Taking this fact as a basis, it is possible to devise a general process that will permit the visibility of any symmetrical woof or network appertaining to the image to be screened, to be virtually eliminated in projection. For example, in the case of a trichrome network composed of parallel lines respectively red, green and blue, such as is utilized with certain colour photography processes, the network is focused in an objective and projected on a screen by means of a suitable source of light: The screen will have the whole of its area covered by lines more or less rough according to enlargement and respectively blue, green and red. The projection pencil or beam is divided into three zones perpendicular to the trichrome lines thrown on the screen; and according to the above set forth principle, two of these zones can be masked without the screen ceasing to be covered over its whole surface by the trichrome lines referred to, and this will hold true irrespective of the zone left uncovered. The network is then projected in such a way that the stripes will appear vertical which is done by masking the upper and lower parts or zones of the objective, leaving unmasked only the central part thereof. Then the opaque device that masks the upper zone of the objective is replaced by a prism $B^1$, the angle of which is very small, just sufficient to displace the projection by the value of one line, with the result that over the whole surface or area of the screen there will be superimposed on the blue lines projected by the central zone of the objective green lines projected by the upper zone, the beam or pencil of which is deflected by the prism; similarly, on the green lines red lines will be superimposed, and blue lines on the red lines. The mixing of such radiations will give lines respectively blue-green, yellow and violet. I then replace the device that masks the lower zone of the objective by a prism the deflection of which differs inversely from that of the one of the upper zone (or that offers double deflection) so as to cause the red lines projected by the lower zone of the objective to coincide with the blue lines of the central zone (and, consequently, with the green lines of the upper zone). In that case, the blue lines projected by the central zone of the objective will receive the green lines projected by the upper zone and the red lines projected by the lower zone; similarly, the green lines will receive the red and the blue lines of the two other pencils;

lastly, the red lines will receive the blue lines and the green lines of the said pencils. As a matter of fact, every point of the projection screen will receive simultaneously the three primary radiations, red, green and blue; therefore it will be uniformly white (instead or "appearing" white through retinian diffusion as is the case when looking at a trichrome network from sufficiently afar).

The same reasoning would obtain supposing the projected screen carried a photographic image. White objects naturally will appear white on the screen, according to what has been above explained. But in the case of an object offering a uniform monochrome colour, say red, the network of the photographic image will be transparent only opposite the red lines of the network, the red and the blue lines being respectively covered by opaque parts of the silver image. If projection is effected by means of a single zone of the objective, there will appear on the screen, over the whole part corresponding to the said red object, real red hatchings separated by black hatchings twice as wide, corresponding to the green and to the blue lines which do not exist in the red ones. Then if projection is effected by means of the three zones of the objective and of the two prisms, it will be apparent that at the points corresponding to the green and to the blue lines projected by the central zone of the objective will fall precisely the red lines of the pencils from the two other zones: the result is that the black hatching which appear when screening by means of a single pencil, will be replaced by red lines of equal width. The red object will therefore ultimately be represented by a set of joined red lines, in other words by a uniform red surface. As regards objects complexly coloured the reasoning does not vary and demonstrates that hues which when projected as a single pincil offer a hatching-like appearance, are replaced by continuous, uniform hues.

This stands true whether networks coloured with real paints or virtually coloured networks are screened. It remains true also with all networks offering an axis of symmetry (or several axes), but it should be clearly understood that in such a case the prisms should be arranged in accordance with the optical conditions necessitated by the said axes of symmetry.

Lastly the above set forth characteristic of effacing networks in screening is not solely applicable to the coloured networks used in colour photography, but is also applicable to opaque imitation-engraving networks and can serve to eliminate "waterings" on reproduction.

All the foregoing deals only with projection of reticulated images, and demonstrates that my invention causes practical disappearance of the network on screening.

The interest of its utilization is, therefore, general since it will permit projections to be watched from a shorter distance without retinian diffusion having to intervene.

The importance of applying my invention to the reprinting of reticulated images is even greater, amounting almost to necessity. In fact, there exist very few conjugated network systems which will permit reprinting of an image carried on a network by means of a photographic surface provided with another network without producing watering with the first one. The formation of watering is well nigh prohibitive of reprinting symmetrically networked images. It will now be apparent that, by applying the new characteristic of my invention to apparatus for printing by projection, reprinting will no longer involve difficulties in any case whatsoever since, practically, the network of the projected image disappears: only the network of the surface to be printed intervenes therefore in the formation of the new image, the result being that the latter network may be of any character as regards the network of the original image without giving rise to the phenomenon known as "watering".

The single figure shows in perspective an objective A of an optical system such as a projector, said objective having associated therewith a color filter or diaphragm A'. The invention preferably is practiced in connection with films having a multiplicity of refringent elements thereon such as shown, for example, in my previous patent, No. 992,151, granted May 16, 1911. It may, however, as stated above, be used with other types of films having a colored network thereon. The invention may be practiced either in connection with projecting a picture onto a screen or onto a second or copy film having similarly arranged refringent elements. When used in connection with a copy film to reproduce a picture thereon the objective may be used without a trichrome diaphragm such as shown in said patent, whereas when the invention is used for projecting a color picture on a screen, such a diaphragm or filter is preferably used.

In the illustrated embodiment, the beam of light is shown as passing through the diaphragm or filter A' which will thus divide the beam into a plurality of parallel bands, each band corresponding to a color component and the sum of the components giving substantially the sensation of white light. In the form shown, I employ three color components, red, green and blue, these being taken merely as illustrative. I have shown these bands as extending vertically.

Extending across the end of the objective is a plurality of prisms, shown as two in number, B and B'. These prisms will divide the beam into a number of zones corresponding to the number of bands formed by the filter or diaphragm and it will be seen that these zones extend at right angles to the bands and that each zone will contain some color from each of the bands. The prism B will cause a lateral deviation of the light passing therethrough towards one side of the axis of the projection system, whereas the prism B' will cause a similar deviation on the opposite side of the axis, the full lines R representing red rays, the dash lines G representing green rays and the dotted lines B representing blue rays. The amounts of deviation are preferably equal to each other and also preferably equal to the width of one of the color lines C appearing on the screen or film onto which the beam of light is being projected. The width of these lines is measured at the surface on which the beam is projected, whether this surface be a screen or a copy film, and the prism or other deflecting device will be selected and adjusted accordingly. In the illustrated embodiment, we have indicated the lines as being formed on a projection screen, and with exaggeratedly wide spacing.

The result of the above operation is that the three zones form three separate color pictures on the projection surface, whether it be screen or copy film, each picture being displaced laterally with respect to the others and each containing all of the colors necessary to form a true color picture, reproducing the original picture in its true colors. Instead of having one picture with color lines of maximum intensity separated by uncolored portions, the total color is evenly distributed over the entire projection surface. The amount of displacement, as noted above, is preferably equal to the exact width of the color line or it may be a small multiple thereof. For best results, however, it should be substantially equal to the width of a single color line as appearing and measured on the projection surface.

Having now particularly ascertained and described the nature of my said invention as well as the manner in which the same is to be performed, I declare that what I claim is:

1. A method of eliminating the appearance of nets in the projection, on a screen, of color films having refracting elements, consisting in projecting the film on the screen while dividing the projection beam into different definite zones; and, at the moment of projection, shifting the projection of a selected zone of the beam laterally with respect to the lines of the film projected on the screen and to the width of a single one of such lines, but in a direction deviating from that of normal projection.

2. A method of eliminating the appearance of nets in the projection, on a screen, of trichrome color films having refracting elements, consisting in projecting the film on the screen while dividing the projection beam into three different zones each containing all of the colors to be projected; and, at the moment of projection, shifting the projection of the two outer zones of the beam laterally with respect to the lines of the film projected on the screen and to the width of a single one of such lines, but in directions deviating from the direction of normal projection, and on opposite sides of the axis of the projection system while allowing projection of the central zone to take place in normal manner.

3. The method of projecting color pictures from films having a multiplicity of refringent elements thereon, which comprises projecting a beam of light from the film while separating the projection beam into a plurality of zones extending transversely of said elements and while displacing to a slight extent each zone of the beam with respect to the others and laterally with respect to said elements.

4. The method of projecting color pictures from a film onto a screen, said film having a multiplicity of refringent elements thereon, which comprises forming in an objective a plurality of parallel bands, each band transmitting a light component and the sum of said components forming substantially the sensation of white light, transmitting light from said bands to said screen in a plurality of zones crossing said bands, each zone transmitting some light from each band, while laterally displacing each zone with respect to the others.

5. The method of projecting color pictures from a film onto a screen, which comprises forming in an objective a plurality of parallel bands, each band transmitting a light component and the sum of said components forming substantially the sensation of white light, transmitting light from said bands to said screen in a plurality of zones crossing said bands, each zone transmitting some light from each band, while laterally displacing each zone with respect to the others.

6. The method of projecting color pictures from a film onto a screen, which comprises dividing the projection beam into parallel bands of components of white light and projecting the light from said bands onto said screen in a plurality of zones extending substantially at right angles to said bands, each zone transmitting some light from each of said bands, while displacing said bands laterally with respect to each other to a slight extent.

7. The method of projecting color pictures from a film onto a screen and avoiding the appearance of color lines, which comprises dividing the projection beam into parallel bands of components of white light and projecting the light from said bands onto said screen in a plurality of zones extending substantially at right angles to said bands, each zone transmitting some light from each of said bands, while displacing said bands laterally with respect to each other the width of one color line.

8. The method of projecting color pictures from a film having thereon a multiplicity of parallel fine areas corresponding to color components, which comprises dividing the projection beam into a plurality of parallel zones extending transversely of said areas and corresponding in number to the number of said color components while displacing one zone with respect to another in a direction parallel to the length of said zones.

9. The method of projecting color pictures from a film having thereon networks corresponding to color components, which comprises forming in an objective a plurality of parallel bands, each band transmitting a light component and the sum of said components forming substantially the sensation of white light, transmitting light from said bands in a plurality of zones crossing said bands, each zone transmitting some light from each band, while laterally displacing each zone with respect to the others.

10. The method of projecting color pictures from a film having thereon networks corresponding to color components, which comprises forming in an objective a plurality of parallel bands, each band transmitting a light component and the sum of said components forming substantially the sensation of white light, transmitting light from said bands in a plurality of zones crossing said bands, each zone transmitting some light from each band, while laterally displacing each zone with respect to the others an amount equal to the width of one color line.

11. In a device of the class described, an objective, means for dividing the light coming from said objective into bands corresponding to color components, means to divide said bands into the same number of zones as there are bands, with the zones extending in a direction transverse to the direction of said bands, and means to deflect said zones laterally with respect to each other to a slight extent.

12. In a device of the class described, an objective, means for dividing the light coming from said objective into bands corresponding to color components, means to divide said bands into the same number of zones as there are bands, with the zones extending in a direction transverse to the direction of said bands, and means to deflect said zones laterally with respect to each other an amount equal to the width of a color line formed by said objective.

13. In a device of the class described, an objective adapted to project a beam of light onto a screen, a diaphragm associated with said objective and through which said beam of light passes, said diaphragm dividing the beam into parallel bands each corresponding to a color component, means extending substantially at right angles to said bands and extending across them and adapted to divide the beam further into zones, each formed of some light from each of said bands, and means to laterally displace all of said zones with respect to each other.

14. In a device of the class described, an objective adapted to project a beam of light from a film having fine areas thereon corresponding to color components, and prisms disposed across said objective transversely of said areas and splitting the beam of light coming therefrom into zones corresponding in number to the number of said components.

15. In a device of the class described, an objective adapted to project a beam of light from a film having fine areas thereon corresponding to color components, and prisms disposed across said objective transversely of said areas and splitting the beam of light coming therefrom into zones corresponding in number to the number of said components, said prisms deflecting said zones in opposite directions from the axis of the objective.

16. The method of projecting color pictures from film having a multiplicity of refringent elements thereon, which comprises projecting a beam of light from the film while separating the projection beam into a plurality of zones extending transversely of said elements and while causing each zone of the beam to take a path having a slight angle with respect to the others, as measured transversely of said elements.

17. The method of projecting color pictures from a film having thereon a multiplicity of parallel fine areas corresponding to color components, which comprises dividing the projection beam into a plurality of parallel zones extending transversely of said areas and corresponding in number to the number of said color components while causing each zone of the beam to take a path having a slight angle with respect to the others, as measured transversely of said elements.

18. In a device of the class described, an objective adapted to project a beam of light from a film having a multiplicity of parallel fine areas thereon corresponding to color components, and means to split said beam of light into zones corresponding in number to the number of said components and extending transversely with respect to said areas and to cause each zone of the beam to take a path slightly displaced with respect to the paths of the other zones in a direction transversely of said areas.

19. In a device of the class described, an objective adapted to project a beam of light from a film having a multiplicity of parallel fine areas thereon corresponding to color components, and means to split said beam of light into zones corresponding in number to the number of said components and extending transversely with respect to said areas and to cause each zone of the beam to take a path having a slight angle with respect to the others, as measured transversely of said elements.

In testimony whereof I affix my signature.
RODOLPHE BERTHON.